3,277,787
Patented Oct. 11, 1966

3,277,787
DEVICE ON AN AUTOMATIC FIREARM FOR THE SELECTIVE FIRING OF TWO KINDS OF AMMUNITION FROM TWO SEPARATE BELTS
Hans Brieger, Zurich, Switzerland, assignor to Machine Tool Works Oerlikon Administration Company, Zurich-Oerlikon, Switzerland
Filed Nov. 23, 1964, Ser. No. 413,118
Claims priority, application Switzerland, Nov. 26, 1963, 14,464/63
14 Claims. (Cl. 89—33)

The invention relates to a device on an automatic firearm for the selective firing of two kinds of ammunition from two separate belts with a belt transporting mechanism driven by a driving mechanism.

In a known weapon of this kind the belts have to be changed over by hand, when the weapon has to be changed over from one kind of ammunition to the other, one of belts being arrested in a position of readiness, while the other belt has to be inserted anew into the weapon by hand from its position of readiness, a tongue having to be readjusted at the same time for the formation of a suitable supply channel. Such change-overs are time-wasting, the loss of time being decisive for the suitability or otherwise of anti-aircraft guns for combatting also armoured vehicles which may appear surprisingly.

Such a change-over by hand is also disadvantageous when there should be the possibility of firing ammunition of various kinds from a weapon mounted outside the protective tower of an armoured fighting vehicle, i.e. again when a weapon serving primarily for anti-aircraft defence has to be used also for the combatting of armoured targets on the ground, for which purpose in addition to explosive projectiles also hard core ammunition has to be available. Such an arrangement involves the necessity of an instantaneous change-over to the supply of the other kind of ammunition.

Weapons are also known, into which the cartridge belt can be introduced at will from the left hand side or from the right hand side. The problem of these weapons is not, however, as rapid as possible a change-over from the kind of ammunition contained in one belt to that contained in the other belt, because no provision whatever is made for holding the belt, which is not actually in use, in a position of readiness, since the only provision made is for being able to introduce the belt from one side of the weapon or the other, depending on local conditions.

According to the new device there exists the great advantage, that merely by actuating a change-over mechanism the weapon can be automatically changed over from one kind of ammunition to an other.

The present invention has the primary object of overcoming these disadvantages and of providing a device allowing an automatic change-over from one sort of ammunition to another by simple actuation of a change-over mechanism.

With this and other objects in view, which will become apparent later from this specification and the accompanying drawings, we provide a device for the selective firing of two kinds of ammunition, comprising in combination: a casing, a separate belt and belt transport mechanism for each kind of ammunition arranged in said casing on the left hand side and on the right hand side, respectively, of the longitudinal axis of the firearm, a driving mechanism in common for both said transport mechanisms, a change-over mechanism in operation coupling at will one of said two transport mechanisms with said driving mechanism while uncoupling the other, and at the same time changing over the supply of cartridges from one of said belts to a supply from the other belt, a belt entrance opening being provided in said casing on the left hand side and right hand side of said axis of the weapon and leading to said belt transport mechanisms, respectively, an exit opening being provided in said casing between said two entrance openings.

These and other features of our said invention will be clearly understood from the following description of a preferred embodiment thereof given, by way of example only, with reference to the accompanying drawings, in which:

On the automatic firearm a casing 2 is so mounted and guided that a relative sliding movement is possible between the same and the breech sleeve 1. On both sides of the longitudinal axis of the weapon and parallel thereto two hollow shafts 3 and 103 are journalled in the casing 2, on which shafts transport wheels 4 and 104 are keyed, which are constructed as star wheels. On each of these shafts 3 and 103 two driver members 5, 6 and 105, 106, respectively, are mounted rotatably, and moreover the ends of the shafts 3 and 103 are shaped in the usual form of key shafts for the purpose of establishing a driving connection. On these shaft ends bushings 7, 8 and 107, 108 respectively, provided with correspondingly grooved hubs, are slidable, which are forced by the bias of springs 9 against the hubs of the driver members, these springs 9 being arranged in sleeves 10 and abutting the flanged ends 11 of the shafts 3, 103. The end faces of the bushings 7, 8 and 107, 108, respectively, facing the transport wheels 4, 104, which act as transport mechanism for the belts, as well as the adjacent end faces 5b, 6b and 105b, 106b, respectively, of the driver members have serrations 12 designed for mutual engagement and so constructed that they act as free wheel clutches by means of which movements of the driver members 5, 6 and 105, 106 can be transmitted only in one sense of rotation to the bushings 7, 8 and 107, 108, and accordingly to the shafts 3, 103. These free wheel clutches are moreover so constructed that by then the shaft 3 (as viewed in FIG. 12) is driven clockwise, while the shaft 103 is driven counterclockwise.

Figure 1:
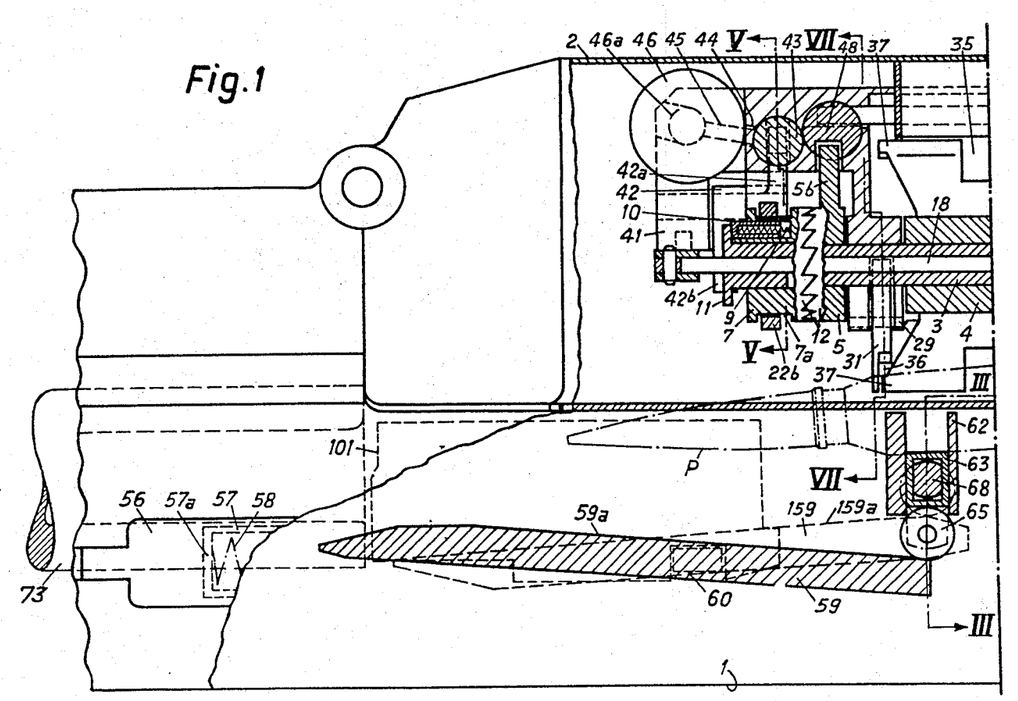
FIGS. 1 and 2 are an elevation of the weapon, partly in section on the line I—I of FIG. 4 through a belt transport wheel.
Figure 3:
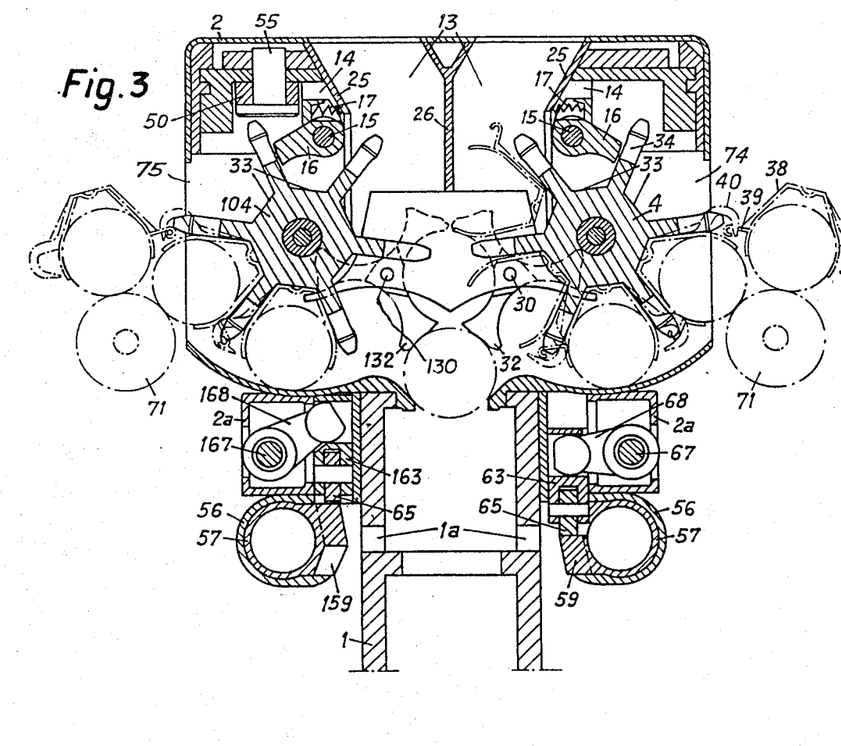
FIG. 3 is a section of the weapon on the line III—III of FIGS. 1 and 2.

In accordance with the FIGS. 1 and 3 lugs 14 are connected with walls 25 of the casing 2, which together with a middle wall 26 form the boundaries of channels 13 constructed as guides for the discharge of the empty belt links, axles 15 for pawls 16 being fixed in said lugs. These pawls 16 are biased by restoring springs 17 and are moreover so arranged and constructed that they are lifted by cut-out portions of combs 34 of the transport wheels 4, 104 turning in the direction of conveying, and are returned by the springs 17 to a position, in which they stand behind these combs and prevent any turning of the transport wheels in the sense opposite to conveying.

Figure 5:
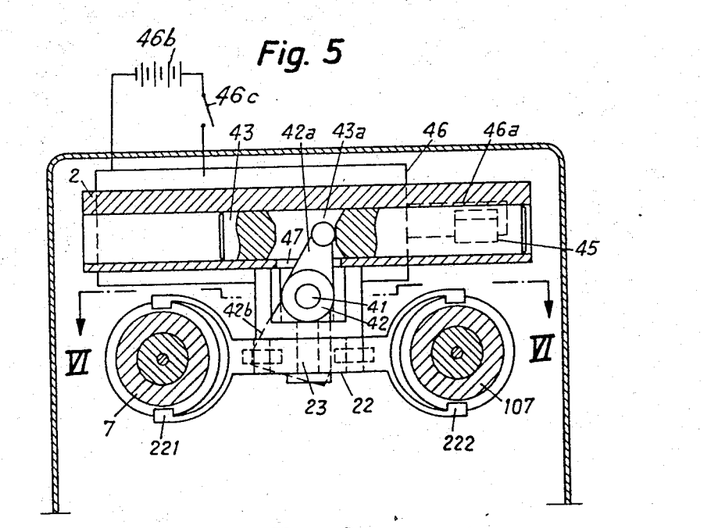
FIG. 5 is a section on the line V—V of FIG. 1.
Figure 6:
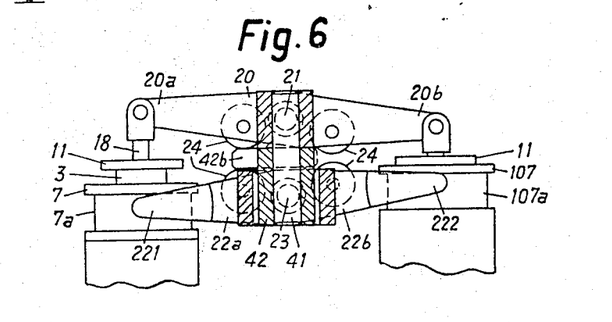
FIG. 6 is a section on the line VI—VI of FIG. 5.
Figure 7:
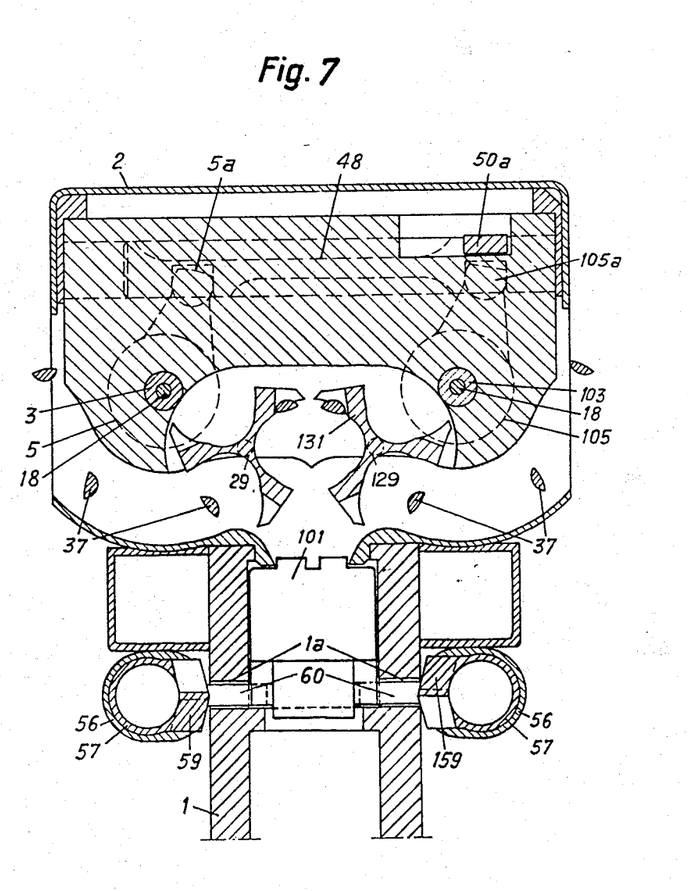
FIG. 7 is a section on the line VII—VII of FIG. 1.

In the shafts 3 and 103 rods 18 are slidably arranged, at the end of each of which a bracket 19 is fixed, which embraces the rear flange of its associated bushing 8 and 108, respectively, while in accordance with FIG. 6 the forward ends of the rods 18 are connected with a lever 20, which is pivotally mounted on an axle 21 fixed to the casing. The forked ends 221, 222 of a further lever 22 pivoted about an axle 23 parallel to the above axle embrace in accordance with FIG. 5 the forward bushings 7 and 107 in their grooves 7a and 107a. On each of these levers 20 and 22 rollers 24 are journalled on both sides of the pivot axles 21, 23 at equal distances from them, which rollers are rotatable about axes parallel to the pivot axles 21, 23 of the levers and protrude beyond the bodies of these levers.

Figure 13:
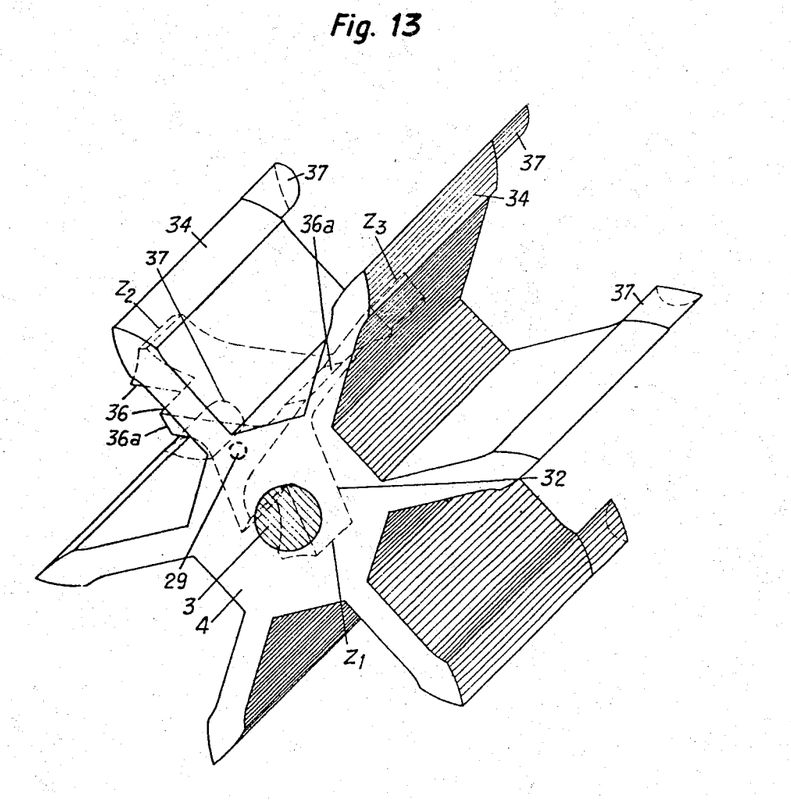
FIG. 13 is a perspective view of the end of a belt transport wheel and of a star wheel.

In slots of the casing 2 on both sides thereof two star wheels 31, 32 and 131, 132, respectively, are mounted on shafts 29, 30 and 129, 130, respectively, the wheels 31 and 131 being designed for engaging on the forward portion, and the wheels 32 and 132 for engaging on the rear portion of the cartridges P. On each of the three teeth $Z_1$, $Z_2$ and $Z_3$ of these star wheels recesses 36 are cut out radially inward from the circumference on the sides facing the transport wheels 4 and 104 as shown in FIGS. 1 and 13. These transport wheels 4, 104 have each six interstices 33 designed for taking in cartridges contained in links of the belts, and both of them are provided at the ends of the circumference of their combs 34 with semi-cylindrical extensions 37 (FIGS. 1 and 13) directed parallel to the shafts 3, 103, which extensions protrude into the path of those parts of the star wheels 31, 32 and 131, 132, which contain the recesses 36, namely in such a manner, that the teeth of the combing-out device form an intermittently disengaged coupling with the extensions of the belt transport star wheels 4, 104. The combs 34 are provided with cut-outs 35, through which the connecting parts of the belt links 38, i.e. the eyes 39 and hooks 40 are linked with one another, these belt links being lodged in the individual interstices 33 of the transport wheels 4 and 104.

On an axle 41 fixed to the casing, lying between the shafts 3 and 103 of the transport wheels and parallel thereto, a two-armed lever 42 is pivotally mounted. In a bore of the casing directed transversely of the shafts 3 and 103 a control rod 43 is slidably mounted, which is connected by an arm 45 guided in a slot 44 of the casing 2 with the armature plunger 46a of a solenoid 46 fixed to the casing 2. The solenoid 46 is connected with a power source 46b and is operable by a switch 46c. One arm 42a of the lever 42 reaches through an opening 47 into a groove 43a of the control rod 43 and the flat other lever arm 42b reaches between the two levers 20 and 22.

In a bore of the casing parallel to the control rod 43 a push rod 48 is slidably mounted, in whose grooves 48a the arms 5a, 105a of the forward driver members 5 and 105 engage. On an axle 49 directed perpendicular to the plane through the axes of the two shafts 3 and 103 and between the two driver members 105 and 106 mounted on the shaft 103 of the transport wheels, a two-armed control lever 50 is pivotally mounted, one arm 50a of which engages in a groove 48b cut into the end of the push rod 48 and whose other arm 50b engages in a groove 51a of a slider 51 guided a slot 52 of the casing directed transversely of the axis of the weapon.

The arms 6a, 106a of the rear driver members 6 and 106 are in engagement with two further grooves 51b of the slider 51. In the groove 51a formed by two cams 51c, which are fixedly connected with the slider 51 and extend from the latter rearwardly through a slot 53 cut in the casing wall engages a middle arm 54c of a three-armed control lever 54, which is rotatable on an axle 55 journalled in the casing 2 between the two transport wheel shafts 3, 103 and parallel thereto.

Figure 12:
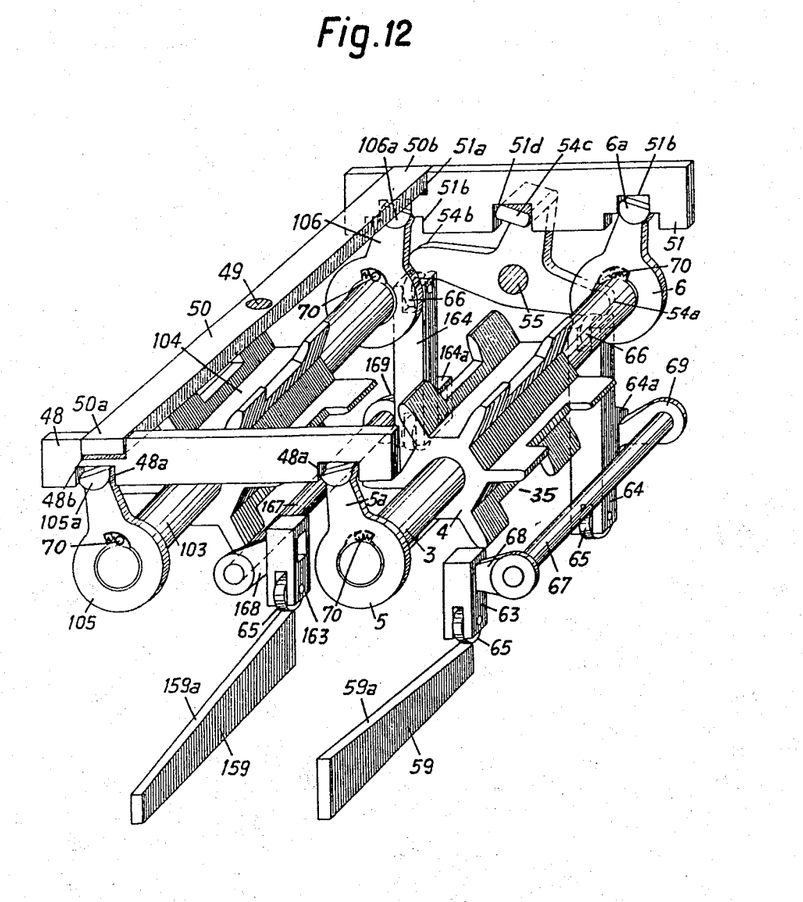
FIG. 12 is a perspective diagrammatic illustration of the driving mechanism of the belt transport wheels.

As shown in the FIGS. 1 and 12 in each of two sleeves 56 fixed to the breech sleeve 1 and lying parallel to the longitudinal axis of the weapon a further, shorter sleeve 57 is mounted slidably. One of the breech-closing springs 58 arranged in these sleeves bears at one end on the forward bottom 57a of a sleeve 57 and at the other end on the rear bottom 56a of a sleeve 56.

On the sides facing the breech sleeve 1 the sleeves 57 carry ledges 59 and 159, which are provided with inclined control ramps 59a, 159a sloping in opposite directions. Thus the control ramp 59a of the right hand side ledge 59 rises from the rear towards the front, while the control ramp 159a on the left hand side drops from the rear towards the front. The level differences are equal between the highest and the lowest points of the ramps 59a and 159a, which are also of equal length. Both sleeves 57 are in driving connection with the breech 101 thereby that cams 60 connected with their ledges 59, 159 reach through longitudinal slots 1a cut into the walls of the breech sleeve 1 into lateral recesses 61 of the breech body 101.

Figure 4:
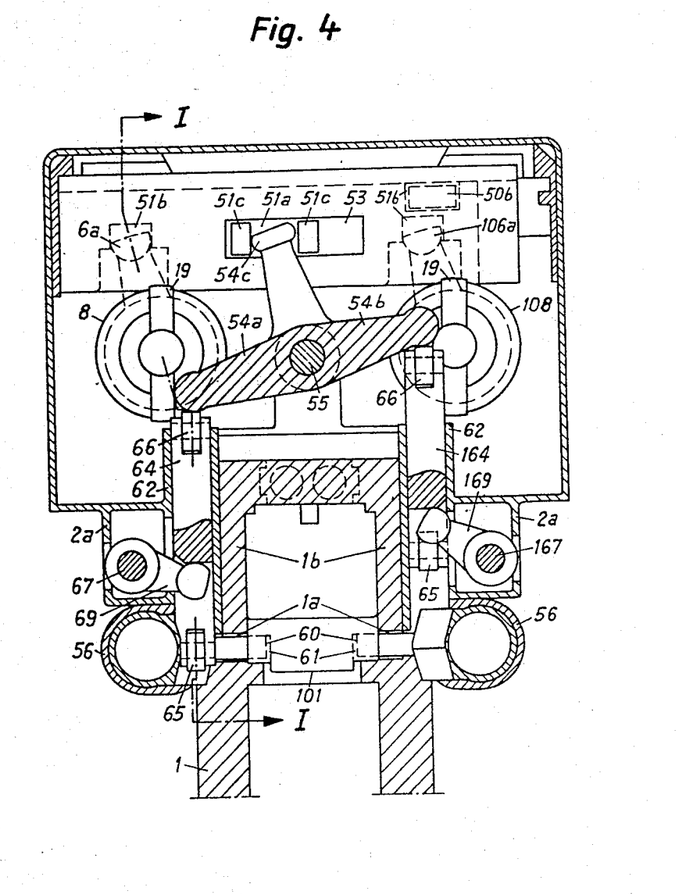
FIG. 4 is a section on the line IV—IV of FIG. 2.

As moreover follows from the FIGS. 1, 3 and 4, sliders 63, 163 and 64, 164 respectively, are guided in guides 62 extending downward in the casing 2 along the walls 1b of the breech sleeve 1, on the lower ends of which sliders rollers 65 are journalled. The two rear sliders 64 and 164 moreover carry also at their upper ends rollers 66, on which the lateral arms 54a, 54b of the lever 54 rest. In the lateral extensions 2a of the casing 2 two shafts 67 and 167 orientated parallel to the axis of the weapon are journalled on each of which two levers 68, 69 and 168, 169, respectively, are fixed. The two forward levers 68 and 168 engage in bores of the sliders 63, 163 directed transversely of the shafts 67, 167, while the extensions 64a, 164a of the sliders 64 and 164 rest on the rear levers 69 and 169. In the extreme forward position of the breech 101 as illustrated in FIG. 1 the forward sliders 63 and 163 rest on the rear ends of the ledges 59, 159, i.e. in accordance with the drawing the slider 63 rests on the lowest and the slider 163 on the highest point of its associated control ramp 59a and 159a, respectively. The left hand side rear slider 64 is held by the lever 69 in such a position, that its roller 65 lies lower than that of the forward slider 63 by a distance, which corresponds to the level difference between the highest and the lowest point of the control ramp 59a or 159a of a ledge 59 or 159, respectively, and furthermore the roller 65 of the right hand side rear slider 164 lies that same distance higher than the roller 65 of the forward slider 163 lying on the same side.

In these positions of the sliders 64 and 164 the control lever 54 is held in an inclined position in which the slider 51 driven by it is in the left hand side end position, and the push rod 48 is kept by the control lever 50 in its right hand side end position. In the position of the levers 20 and 22 illustrated in FIG. 6, in which their left hand side arms 20a, 22a are spread out relative to each other, the rod 18 arranged in the left hand side transport wheel shaft 3 and its bracket 19 are in the forward end position, and the forked end 221 of the lever arm 22a is in the rear end position, whereby the bushing 8 by the bias of the springs 9 is held in the forward position, and the bushing 7 is held in the rear position, so that the serrations 12 of these bushings 7 and 8 are kept in engagement with those of the two driver members 5 and 6 and consequently a driving connection is established between the latter and the shaft 3. As regards the right hand side transport wheel shaft 103 the bracket 19 and the bushing 108 are in the extreme rear position and furthermore the fork 222 of the lever arm 22b with the bushing 107 is in the extreme forward position, so that the serrations 12 of these bushings 107 and 108 are out of engagement with those of the driver members 105 and 106, and accordingly these driver members 105 and 106 are not in a driving connection with the shaft 103.

The manner of operation of the cartridge conveyer mechanism follows from the structure described.

After the igniting of cartridge $P_1$ located in the barrel 73 of the weapon the breech 101 is thrown back, and the sleeves 57 coupled therewith are moved rearward. The roller 65 of the slider 63 then runs on the control ramp, 59a of the ledge 59 and is raised thereby, this rising movement, by the shaft 67 turned by the lever arm 68, being transmitted to the lever 69 and accordingly to the slider 64. By this movement of the slider 64 the lever 54 (as viewed in FIG. 12) is turned in the counterclockwise sense, and thereby the left hand side rear slider 164 is moved downward. This slider 164 transmits its downward movement through the lever 169, the shaft 167 and the lever 168 to the forward slider 163, whose roller 65 moves downward at the same speed at which that of the slider 63 moves upward. After the breech has covered half of its return movement, the roller 65 of the slider 64, which during this movement had been lifted to the level of the lower end of the control ramp 59a, runs up on the latter. During the continued rearward movement of the breech 101, the slider 64 is further raised by this control ramp 59a, and moreover during the first part of the return movement of the breech the roller 65 of the slider 164, lowered to the level of the highest point of the control ramp 159a of the ledge 59, rests on the latter. By the turning of the lever 54 the slider 51 is moved to the the left (as viewed in FIG. 12).

During this movement of the slider 51 the two driver members 6 and 106 are turned, the driver member 106 turning idly, without acting on the shaft 3, while the driver member 106 by its serrations 12 turns the bushing 8 and through the same the shaft 103 and accordingly also the transport wheel 104 in the counterclockwise sense. (In FIG. 12 a simplified illustration has been chosen, wherein the aforesaid free-wheel clutch formed by the serrations of the hub of the driver member and bushing is assumed to be replaced by a coupling formed by clamping rollers 70). By the movement of the slider 51 the lever 50 is turned and by the same the push rod 48 is moved in the opposite direction of the slider 51, whereby the driver members 5 and 105 are turned, without driving any of the two shafts 3 and 103.

Figure 2:
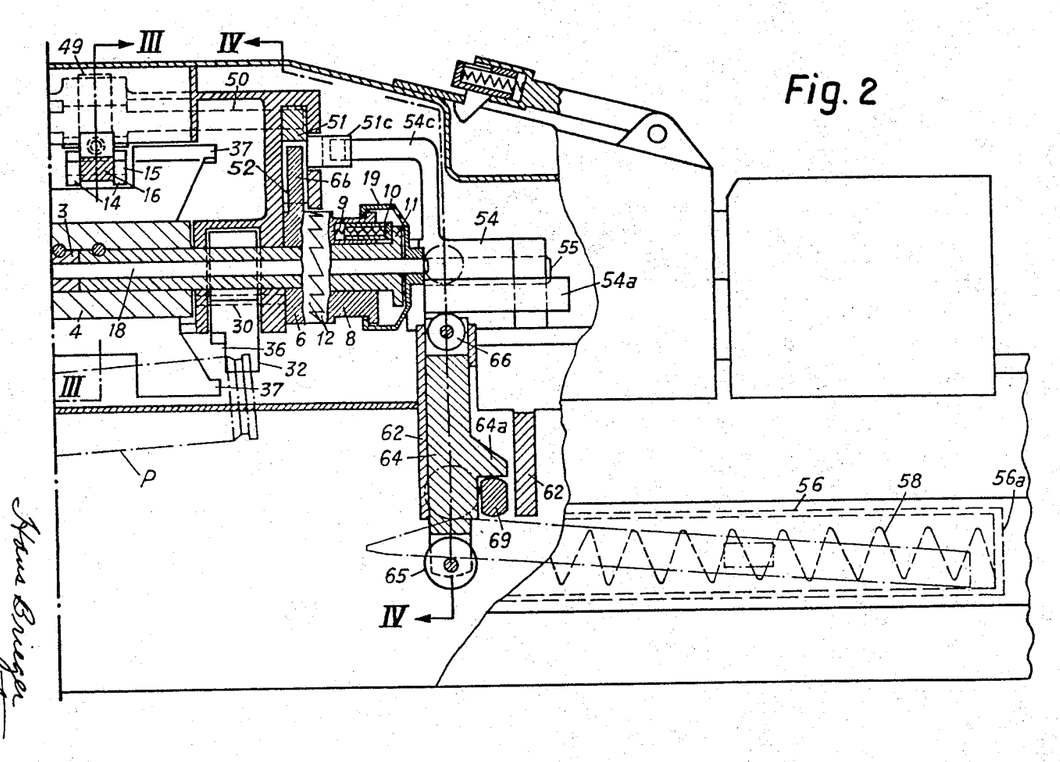

When the breech 101 has reached its rearmost position, the ledge 59 is in the end position indicated in FIG. 2 by dashes and dots, and moreover the slider 64 is in its upper dead centre and the slider in the lower dead centre of its movements, so that then the roller 65 of the slider 164 assumes the lowest position on the ramp 159a. At the movement of the rear reversal of the breech moreover the slider 51 as well as the push rod 48 have reached the reversal points of their movements.

During the forward run of the breech the slider 164, and with it also the arm 54b of the lever 54 resting on it are raised, so that the same turns in the clockwise sense and by its other arm 54a forces the slider 64 downward, whereby its roller 65 keeps in contact with the ramp 59a. At the end of the first part of the forward run of the breech the ramp 159a runs against the roller 65 of the slider 163, which previously had been raised by means of the levers 169, 168 and shaft 163, and the ramp 59a moves with its highest point under the roller 65 of the previously lowered slider 63.

During the second part of the forward run of the breech the slider 163 is accordingly further raised by the ramp 159a, and its movement is transmitted to the rear slider 164 and accordingly to the lever 54. Moreover the slider 64, and with it the slider 63, are again lowered to their starting position, which is reached, when the breech 101 has reached its foremost position, i.e. the position of ignition. The lever 54 drives the slider 51 to the right, and the latter, through the control lever 50, moves the push rod 48 to the left so that the driver members and 105 are turned counterclockwise, the driving member 5 turning idly, while the other one 105 by means of the bushing 7 in engagement with it by the serrations 12 (or according to FIG. 12 by means of the clamping roller coupling) drives the shaft 103 with the transport wheel 104 in the clockwise sense. During this phase of the drive none of the two driver members 6 or 106 turned by the slider 5 drives one of the shafts 3 or 103.

For disengaging for example the left hand side shaft 3 and engaging the right hand side shaft 103 with the drive mechanism, i.e. when changing over the supply of ammunition from the left to a supply from the right, as described above, the control rod 43 (as viewed in FIG. 5) is shifted to the left. Thereby the lever 42 is turned counterclockwise and its arm 42b is forced wedge-like between the two free rollers 24 of the lever arms 20b, 22b, so that the same are moved apart and the arms 20a, 22a which had been spread apart, approach one another. By this movement of the levers 20 and 22 the rod 18 arranged in the shaft 3 is pushed rearward together with the bracket 19, and thereby the serrations of the bushing 8, which is likewise moved rearward, are brought out of engagement with the serrations 12 of the driver member 6. At the same time the bushing 7 is pulled forward and thereby the engagement of the serrations 12 of the bushing 7 and of the driver member 5 is abolished. In contrast, on the right hand side shaft 103 the rod 18 is moved forward, and the bushing 108 is released by the bracket 19 as well as the bushing 107 by the lever 22, so that these bushings 107 and 108 are pushed by the bias of the springs 9 towards the driver members 105 and 106 and their serrations 12 are brought into engagement with the serrations of these driver members. The drive of the right hand side shaft 3 takes place in principle in the same manner as described for the operation of the left hand side shaft 103, the driving connection between this shaft 3 and the driver member 5 and 6 moved by the push rod 48 being established, when the same are turned counterclockwise (as viewed in FIG. 12).

In the FIGS. 8 to 11 there are illustrated the process of transporting the cartridge belts which is exactly the same for both transport wheels 4 and 104, the combing-out of the cartridges from the belt links and the conveying thereof into the position of readiness outside the belt guides and ahead of the breech.

Figure 8:
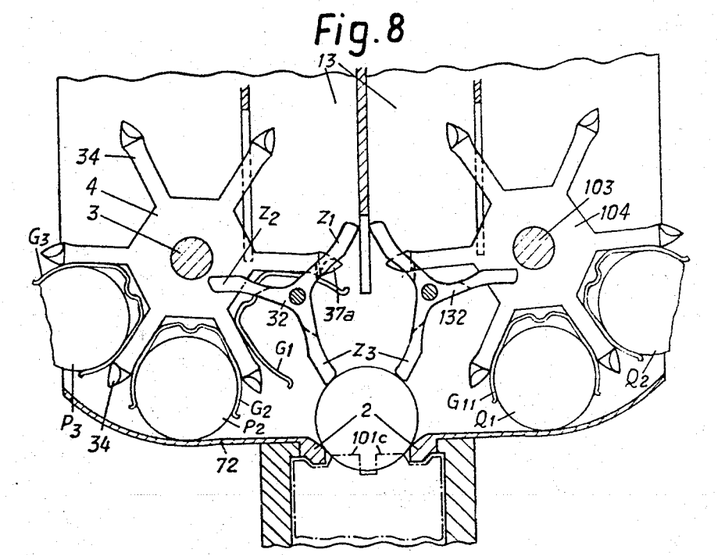
FIGS. 8–11 are diagrammatic illustrations of various motion phase of the cartridge supply members.
Figure 9:
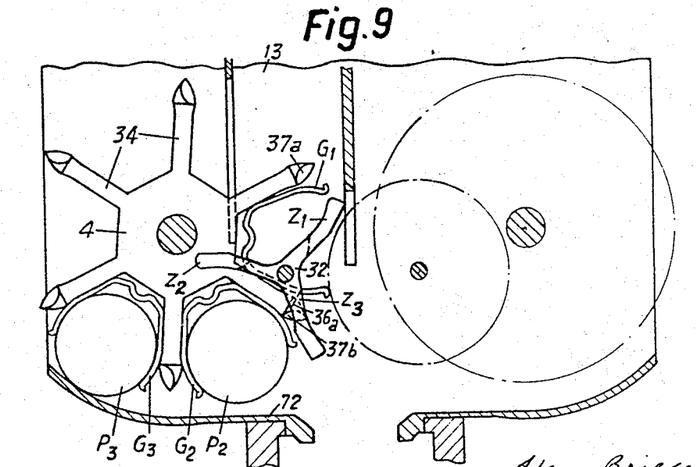

By a transport wheel 4 or 104 engaging with its combs 34 between the cartridges P by means of a roller 71 arranged outside the weapon (FIG. 3) one belt is pulled through one of the openings 74 or 75 lying on the left hand or right hand side of the weapon axis into the interior of the casing 2, and is moved through the weapon along the mutually independent guides 72, 13, which are arranged partly co-axially with the transport wheels 4, 104. FIG. 8 shows the positions assumed by the transport wheels 4 and 104 and the star wheels 32 and 132 cooperating with them, when the breech is in a position, in which it is held by the catch lever of the trigger before firing. After being released the breech when running forward, abuts with its end force 101c the cartridge $P_1$ and pushes the same into the cartridge chamber of the barrel 73. At the beginning of this forward run of the breech the extension 37a of the comb of the transport wheel 4 driven in the manner described hereinabove moves across the recess 36 of the tooth $Z_1$ of the star wheel 32, so that the same (as well as the star wheel 31) does not undergo any driving during the whole forward run, and, together with the likewise stationary star wheels 131, 132 guides the cartridge $P_1$ moved by the breech. Up to the forward reversal of the breech the transport wheel 4 moves the belt so far, that the cartridge $P_2$ thereof assumes the position illustrated in FIG. 9.

Figure 10:
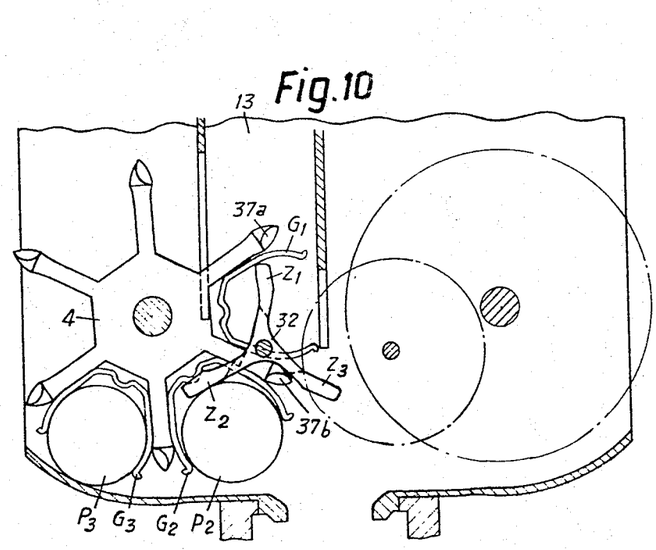
Figure 11:
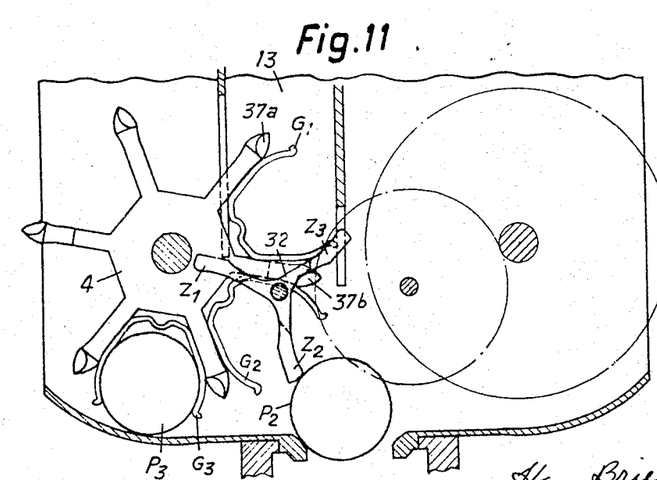

After the igniting of the cartridge $P_1$ and the return movement of the breech, then beginning, the extension 37b of the comb of the transport 4 abuts firstly the face 36a of the tooth $Z_2$ of the star wheel 32, and subsequently, in accordance with the FIGS. 10 and 11, abuts the tooth body $Z_2$ proper, and thereby turns the star wheel counterclockwise, so that, as shown in FIG. 10, the tooth $Z_3$ thereof comes into contact with the cartridge $P_2$ held in the belt link $G_2$. By this tooth $Z_3$ the cartridge $P_2$ is detached from the clamps of the belt link $G_2$ upon further rotation of the star wheel 32 caused by the drive effected by the transport wheel 4, and is moved towards the path of the breech, i.e. towards the middle of the weapon. During the last part of the return run, i.e. during the period, when the breech moves behind the cartridge $P_2$ until it reaches its rear reversal point, this cartridge, which is under the pressure of the star wheel tooth $Z_3$, reaches the position assumed in FIG. 8 by the cartridge $P_1$ (which is shown in FIG. 1 in dashes and dots and is denoted P), in which it is held by the teeth $Z_3$ of the star wheels 32 and 132 contacting it from both sides which are not now driven any more and are accordingly stationary, as well as by the wheels 31 and 131 and is supported by the jaws of the casing 2. Likewise as described for this cartridge $P_2$, the following cartridges $P_3$, etc. conveyed along by the belt are combed out of the belt links $G_3$, etc., are conveyed in front of the breech and are supplied to the barrel.

The empty belt links $G_1$, etc., are moved by the transport wheel 4 to the channel 13, being stripped at the entry into the same from the interstices 33 of the transport wheel 4, and are pushed upward out of the casing 2.

Before the change-over to the supply of the other ammunition supplied by the transport wheel 104, the breech 101 is caught at its rear reversal point by appropriate actuation of the trigger of the weapon by the gunner. Then, in the manner described herein above, when the gunner for example actuates by closing the switch 46c the solenoid 46 operating the control rod 43, the transport wheel 4 is disengaged from the driving mechanism, and the transport wheel 104 is engaged. After renewed actuation of the trigger for the purpose of firing the other kind of ammunition the cartridge lying ahead of the breech and still belonging to the sort of ammunition conveyed by the transport wheel 4, e.g. the cartridge $P_1$ of FIG. 8, is supplied to the barrel and fired. During this forward run of the breech transport wheel 104 moves its belt and thus moves the first cartridge $Q_1$ belonging to the other kind of ammunition, with the star wheels 31, 32 and 131, 132 at a standstill, into a position corresponding to that indicated in FIG. 9 for the cartridge $P_2$, whereafter on the return run of the breech this cartridge $Q_1$ is combed out of the belt link $G_{11}$ by the star wheel 131, 132 now driven by the transport wheel 104, and is moved in front of the breech. In the same manner all further cartridges $Q_2$, $Q_3$, etc., conveyed by this belt are combed out and moved into the firing position.

While I have herein described and illustrated in the accompanying drawings what may be considered a typical and particularly useful embodiment of my said invention, I wish it to be understood, that I do not limit myself to the details and dimensions shown and illustrated; for obvious modifications will occur to a person skilled in the art.

What I claim as my invention and desire to secure by Letters Patent is:

1. Ammunition feed mechanism for an automatic firearm comprising two cartridge belts made up of separate links, two belt-transport devices each rotating about one of two axes and each engaging with the links of one of said two belts, two combing out members rotatably mounted about axes parallel to the axes of said transport devices, each of said combing out members being in driving connection with one of said transport devices, means for the stepwise drive of both said transport devices, coupling elements for the selective coupling of either of said transport devices for clamping the other transport device and its associated combing out member in a stationary position, and means on said combing out members arranged so that the stationary combing out member forms a guide for the cartridges fed by the other combing out member.

2. Belt-switching device for an automatic firearm with an axially reciprocating breech, comprising a cam track fitted to said breech, a step-feed mechanism having two followers arranged axially one behind the other which engage one after the other with said cam track as the breech slides backwards and forwards, and a movably mounted transmission member to which both said followers are attached.

3. Belt-switching device in accordance with claim 2, wherein a step-feed mechanism having two pairs of followers is provided, of which one pair is controlled by a first cam track and the other pair by a second cam track.

4. Belt-switching device in accordance with claim 2 wherein a torsion bar is provided connecting said followers to one another.

5. Belt-switching device in accordance with claim 4 wherein two slides, each carrying a follower are provided.

6. Belt-switching device in accordance with claim 2 wherein the distance between said followers is approximately equal to the profile of the cam track.

7. In and for an automatic fire arm having a breech and a barrel, a device for the selective firing of two kinds of ammunition, comprising in combination: a casing, a separate belt and belt transport mechanism for each kind of ammunition arranged in said casing on the left hand side and on the right hand side, respectively, of the longitudinal axis of the firearm, a driving mechanism in common for both said transport mechanisms, a change-over mechanism in operation coupling at will one of said two transport mechanisms with said driving mechanism while uncoupling the other, and at the same time changing over the supply of cartridges from one of said belts to a supply from the other belt, a belt entrance opening being provided in said casing on the left hand side and right hand side of said axis of the firearm and leading to said belt transport mechanisms, respectively, an exit opening being provided in said casing between said two entrance openings, two belt guides and two cartridge combing-out mechanisms each coupled with one of said belt transport mechanisms and in operation conveying the cartridges from the belt of the belt transport mechanism actually coupled with said driving mechanism to a position of readiness outside its associated belt guide, from where they are moved by the breech of said firearm into the barrel thereof.

8. A device as claimed in claim 7, wherein each of said belt transport mechanisms comprises a star wheel having teeth and extensions on the circumferential ends of said teeth and wherein each of said combing-out mechanisms likewise comprises a star wheel having teeth with recesses on said teeth, each of said belt transport mechanism cooperating with its associated combing-out mechanism, by the teeth of the latter forming an intermittently disengaged coupling with said extensions of said transport mechanism star wheels.

9. A device as claimed in claim 8 wherein said two belt guides are independent of one another, each being arranged partly coaxial with the star wheel of its associated belt transport mechanism.

10. Cartridge feeding device for an automatic firearm comprising a housing, two cartridge belts constituted by individual links and guided in said housing, two transport devices provided with mobile elements, and located in said housing where said elements attack between the links of a belt in order to transport the respective belt, driving means and a clutch selectively connecting said driving means with one of said two transport devices.

11. Cartridge feeding device for an automatic firearm comprising two cartridge belts constituted by individual links, a housing with two pairs of opposed sidewalls where the sidewalls of the one pair are transverse to the sidewalls of the other pair; two belt inlets each of which is arranged in one sidewall of one of said two pairs of sidewalls, a belt outlet arranged in one sidewall of the other pair of sidewalls and a cartridge outlet arranged in the sidewall opposed to the last named sidewall, a transport device for each belt arranged in said housing with mobile elements attacking between the links of the last named belts for transporting the last named belt from one of said belt inlets to said belt outlet.

12. Cartridge feeding device for an automatic firearm comprising a housing; two cartridge belts guided in said housing and constituted of individual links, two pinions located in said housing for the transport of one each of said two cartridge belts; a step-transmission for selectively driving one of said two pinions and a selective shifting device connecting said step-transmission with one of said two pinions.

13. Cartridge feeding device for an automatic firearm comprising a cartridge belt constituted of individual links with one opening each in each link, a shaft and a first pinion arranged on said shaft which has a number of teeth attacking between the links of the cartridge belt in order to grasp one link holding one cartridge between two teeth of the pinion with a radially outwardly directed opening for transporting the cartridge belt; a first guiding element to lead the cartridge belt in; a second guiding element arrangement transversely to said first guiding element for leading the cartridge belt out; a second pinion for ejection of the cartridges from the cartridge belt having teeth for attacking between a cartridge located between two teeth of the first pinion and the shaft of the first pinion in order to eject the cartridge in a radial direction from said first pinion and the belt link.

14. Cartridge feeding device for an automatic firearm comprising a cartridge belt which is formed by individual links with one opening each; a first pinion forming a belt transport device having teeth which attack between the links of the cartridge belt; a second pinion constituting an ejection device and also having teeth; one cam each in each tooth of said first pinion and one recess each in each tooth of said second pinion where the cams in the teeth of said first pinion drive said second pinion and the recesses in the teeth of said second pinion cause a periodic arrest of the latter.

References Cited by the Examiner

UNITED STATES PATENTS 2,501,143   3/1950   Sanford ______________ 89—3

FOREIGN PATENTS 465,109   5/1950   Canada.

BENJAMIN A. BORCHELT, *Primary Examiner.*

FRED C. MATTERN, JR., *Examiner.*

S. C. BENTLEY, *Assistant Examiner.*